United States Patent Office 3,288,842
Patented Nov. 29, 1966

3,288,842
ALKOXYALKYL ESTERS OF CARBOXYLIC ACIDS
Joseph A. Verdol, Dolton, Ill., assignor to Sinclair Research, Inc., Wilmington, Del., a corporation of Delaware
No Drawing. Filed Mar. 6, 1962, Ser. No. 177,747
9 Claims. (Cl. 260—475)

This invention is a novel composition of matter; to wit, the tertiary alkoxyalkyl esters of carboxylic acids, and a method for manufacturing these esters. The compositions are useful as intermediates in the preparation of polyester and other resin materials of good uniformity and high molecular weight. See my copending application Serial No. 177,749, now U.S. Patent No. 3,250,802, filed of even date herewith. In the invention, at least one carboxy radical of an acid is joined to a tertiaryalkoxyalkyl radical by an ester linkage while other carboxy radicals, if any, may be in the free acid form or may be joined by ester linkages to alkyl radicals or to similar or different tertiaryalkoxyalkyl radicals. The alkyl may be a hydrocarbon or an oxyhydrocarbon. The esters may have the following general formula:

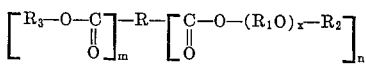

where R is a hydrocarbon radical, preferably unsubstituted. R will generally be of 1–40 or more carbon atoms, preferably 2 to 20 carbon atoms, aromatic, straight, branched or cyclic aliphatic; it may be saturated or unsaturated and may be substituted with other materials or radicals which do not interfere with esterification reactions or the uses of the finished material; it is generally the hydrocarbon residue of a carboxylic acid. The substituents or unsaturation may offer sites for polymerization or cross-linking of polymer by methods other than esterification, or R itself may be the result of polymerization, for example, of acrylic acid derivatives. $R_1$ is a divalent hydrocarbon radical, for example, alkylene, of 2 to 12, preferably 2 to 8 carbon atoms. This radical can be saturated, unsaturated, substituted (even with inorganic materials such as silicon or boron), or unsubstituted aliphatic (including cycloaliphatic), straight or branched chain. Ordinarily $R_1$ is the hydrocarbon residue of a glycol and for a simple glycol residue the value of $x$ is 1. Where $x$ is a number greater than 1, the radical —($R_1O$)— is the residue of a polyglycol or ether glycol such as polyethylene glycol, etc. Preferably $x$ is 1 to 5 although it may be up to about 25 or more. $R_2$ is a monovalent tertiary hydrocarbon radical of 4 to 10, preferably 4 to 7, carbon atoms and is usually derived from a tertiary olefin. The tertiary radical has its valence bond to the —($R_1O$)$_x$— the group at the tertiary carbon of the $R_2$ group. $R_3$ is hydrogen or hydrocarbon, including oxyhydrocarbon. $R_3$ is monovalent and preferably lower alkyl, advantageously of 1–4 carbon atoms. The lower alkyl may be substituted to give an oxyhydrocarbon group such as [$R_4$—($OR_1$)$_x$—] in which $R_4$ is hydrogen or non-tertiary lower alkyl. $n$ is one or more and the total of $n$ and $m$ is at least 1, preferably 2 to 6, and may be as high as the carbon content of R will permit. Thus $m$ is a number and can be zero. Preferably $n$ is 2 and $m$ is 0.

The composition of this invention serves as a useful intermediate in the preparation of materials, for example polyester resins, of greater uniformity than have heretofore been made on a commercial basis. The compositions of this invention are capable of conversion to the hydroxy material

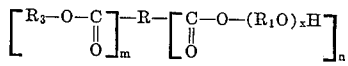

by being heated in the presence of an acid catalyst to release tertiary olefin. This hydroxy material generally can be further converted to polyester by heating, with release of glycol, to produce the resin

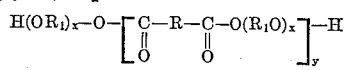

when $m$ is zero and $n$ is two or more or when $R_3$ is removable under transesterification conditions; or

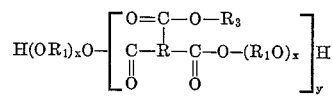

when $R_3$ is not removable under transesterification conditions and $n$ is 2 or more. $y$ is a number preferably large enough to give a solid polymer, for instance about 40 to 150, advantageously about 100 to 125.

The composition of this invention provides, for instance, a feedstock for the production of polyethylene polyesters which has many advantages over presently used feedstocks. For one thing, it enables polymers generally of high molecular weights to be made, perhaps by blocking unwanted reactions. In the art of preparing polyesters such as polyethylene terephthalate (commonly known as "Dacron" or "Terylene" in fiber form or as "Mylar" in film form) the art has not offered a completely statisfactory starting material. If manufacturing is attempted by reacting directly equimolar amounts of terephthalic acid (or its esters) and ethylene glycol under the usual conditions required for esterification or ester interchange, glycol is usually lost by vaporization and this loss causes a stoichiometric imbalance between hydroxyl groups and carboxyl groups, and consequently polymerization stops when polymers of short chain lengths are formed.

The conventional alternative to such a reaction is the use of an intermediate having the structure

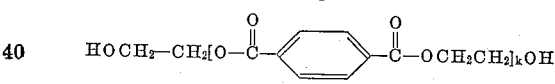

derived from terephthalic acid or a simple ester such as dimethyl terephthalate and a large excess of ethylene glycol. To form a polyester of relatively uniform molecular weight by polyesterification of this intermediate with release of ethylene glycol, $k$ should be uniform for each molecule of the intermediate. However when this intermediate is manufactured directly from glycol, the product usually is, in reality, a mixture of monomer and low molecular weight polymer in which mixture the value of $k$ varies from 1 to 3. The term pre-polymer more aptly describes the intermediate. The degree of polymerization (proportion of $k$ equal to 1, 2, 3, etc.) varies with the temperature, pressure and reactant ratios used in its preparation. Upon reaction of this intermediate with further phthalic acid or upon subjecting the intermediate to conditions which split off and vaporize ethylene glycol, polymerization occurs to produce a resin which is in reality a mixture of polymers of widely varying molecular weights. The actual preparation and isolation of a so-called monomer or pre-polymer intermediate (wherein $k$ equals 1) is difficult to carry out by direct esterification or ester interchange procedures, since higher molecular weight intermediates are always present. These higher molecular weight intermediates have physical and chemical properties similar to those of the pure monomer intermediate (wherein $k$ equals 1) and separation is therefore difficult. In practice, it is customary to use the mixture of prepolymer or monomer intermediates (wherein $k$ varies from 1 to 3 on the average) for subsequent conversion to polyester, and this polyester, or rather polyester mixture, has a melting point of about 250 to 260° C.

This invention however provides the tertiary alkoxyalkyl ester

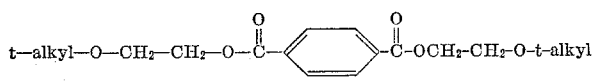

which is easily converted to the pure intermediate

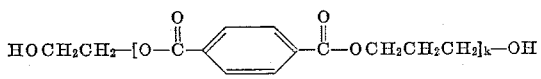

wherein $k=1$. This, in turn may be polymerized to polyethylene terephthalate having a melt temperature of about 270° C., indicating a high and uniform molecular weight.

Intermediates of this invention having an unsaturated R radical are useful to form vinyl-type polymers which may be cross-linked by ester interchange, urethane reactions, etc. Tertiary alkoxyalkyl acrylates may be converted easily to hydroxyalkyl acrylates to avoid the diacrylate impurities present in most commercially available ester products. For example, this invention can provide for the production of hydroxyethyl methacrylate without contamination by ethylene glycol dimethacrylate which is difficult to remove from the monoester by distillation.

The tertiaryalkoxyalkyl esters of this invention can be made by esterifying a carboxylic acid

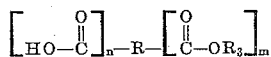

material with $n$ moles of tertiaryalkoxyalkanol of the formula $R_2-(OR_1)_x-OH$. The carboxylic acid material may be any suitable material which contains the acid functionality, that is the "non-oxo carbonylic" (acid, ester or anhydride) group characterized by the

configuration. The ester is formed from the acid material and tertiaryalkoxyalkanol by addition and esterification in the case of the anhydride, and esterification in the case of the free acid. Such direct esterification with the ether alcohol may be catalyzed or non-catalyzed and may be conducted in the absence or presence of an inert solvent such as toluene or xylene, which removes the water formed during the esterification reaction as an azeotrope. Conventional esterification catalysts such as sodium bisulfate, sulfonic acids, sulfuric acid, phosphoric acid, cationic resin catalysts, etc., may be employed but, since these materials have a tendency to decompose some of the tertiaryalkoxyalkanol, non-catalyzed procedures are preferred when direct esterification is to take place. Preferred temperatures for direct esterification are about 100 to 150° C., and also, preferably, enough of the tertiary alkoxyalkanol is employed to esterify all the free carboxyl groups of the acid.

Transesterification is employed to convert other esters of the carboxylic acid to the tertiaryalkoxyalkanol esters and in such circumstances the stoichiometric amount of the tertiary alkoxyalkanol needed to esterify every carboxyl group of the acid material is preferably employed, in order to obtain a pure product. The ester interchange reaction may be carried out in the presence of the acid catalyst mentioned above, but preferably the reaction is uncatalyzed or uses a basic or neutral catalyst. The ester interchange reaction may be carried to completion without a catalyst by using an excess of the ether alcohol. Effective neutral type catalysts are tetraisopropyl titanate, tin oxalate, dibutyl tin oxide, lead oxide, zinc stearate or manganous acetate. The alkali metals may be used and may be in the form of their alcoholates, prepared separately or in situ by adding small amounts of the alkali metals to the t-alkoxyalkanol. Alkali metal hydrides such as calcium, sodium, magnesium and lithium hydrides are also suitable catalysts. The ester interchange reaction for preparing the product of this invention is normally carried out at about the reflux temperature of the reaction mixture at atmospheric pressure, but may be conducted at reduced pressure if desired. Preferred temperatures are in the range of about 100–200° C., although the temperature may reach about 275° C. or more.

As mentioned, acid catalysts, especially strong-acid catalysts, are preferably avoided in order to obviate internal reactions of the ether-alcohol. Catalyst concentrations for catalyzing both esterification and ester interchange reactions are usually in the range of about 0.01 to 0.2% or 2% or more. After the reaction is complete the tertiary-alkoxyalkyl esters may be separated from the reaction mixture using the solvents mentioned above. Other common methods of purification, such as sublimation, distillation, extraction, etc., may also be employed if desired.

Typical carboxylic acids which may be used to provide the

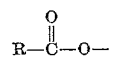

group in accordance with the present invention are: acrylic and substituted and derived acrylic acids, such as crotonic and other butenic acids, oxalic acid, malonic acid, succinic acid, glutaric acid, adipic acid, pimelic acid, suberic acid, azelaic acid, sebacic acid, maleic acid, itaconic acid, citraconic acid, tricarballylic acid, phthalic acid, terephthalic acid, isophthalic acid, alkenyl succinic acids, oleic acid, ricinoleic acid, linoleic acid, linolenic acid, dimethyl vinyl acetic acids, trimesic acid, pyromellitic acid and dimeric acids of unsaturated monocarboxylic acids. The inner or outer anhydrides of these acids are usable as well as the mono- or polyesters of these acids. When a fully esterified acid derivative is to be converted to the tertiaryalkoxyalkyl ester, by ester interchange, the ester group is preferably lower alkyl, to provide for removal of the alcohol of decomposition by vaporization during the ester interchange. As mentioned, dicarboxylic acids of 4 to 12 carbon atoms and their diesters with lower alkanols, are the preferred acid starting materials to produce the preferred esters for polyesterification, that is, esters where $m$ is zero and $n$ is 2 or more. Where "unbalanced" esters having a

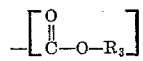

group different from the

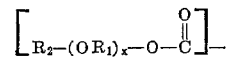

group are to be produced, the $R_3$ substituent, where it is not hydrogen, can be added to the acid by esterification before the resulting material is esterified with the tertiaryalkoxyalkanol. Even before this "unbalancing" esterification, however, it is advisable first to esterify the acid group which is later to be reacted with the tertiary-alkoxyalkanol with a simple low molecular weight alcohol such as methanol, which later is removed in transesterification.

An important facet of the present invention is that a relatively impure polyacid functionality material such as dimethyl terephthalate or terephthalic acid can be employed to form the pure tertiaryalkoxyalkyl ester. For example the bis (2-tertiarybutoxyethyl) ester of terephthalic acid is a crystalline solid and is easily isolated from its reaction mixture in pure form by crystallization from common organic solvents such as petroleum ethers, methanol, ethanol, etc.

The tertiaryalkoxyalkanol, $R_2-(OR_1)_x-OH$, is generally prepared by etherification of the glycol $H(OR_1)_xOH$ with a tertiary olefin, that is, an olefin having a double bond at its tertiary carbon atom. This etherification reaction may be conducted using a cationic exchange material in the hydrogen form and in an amount sufficient to catalyze the selective conversion to the tertiary alkyl monoether. Among the ion exchange materials useful for this reaction are relatively high molecular weight water-insoluble resins or carbonaceous materials containing an SO₃H functional group or a plurality of such groups. These catalysts are exemplified by the sulfonated coals (Zoo-Karb H, Nalcite X, and Nalcite AX) produced by the treatment of bituminous coals with sulfuric acid, and commercially marketed as zeolitic water softeners or base exchangers. These materials are usually available in a neutralized form, and in this case must be activated to the hydrogen form by treatment with a mineral acid, such as hydrochloric acid, and water washed to remove sodium and chloride ions prior to use. Sulfonated resin type catalysts include the reaction products of phenol-formaldehyde resins with sulfuric acid (Amberlite IR-1, Amberlite IR-100, and Nalcite MX). Also useful are the sulfonated resinous polymers of coumarone-indene with cyclopentadiene, sulfonated polymers of coumarone-indene with furfural, sulfonated polymers of coumarone-indene with cyclopentadine and furfural and sulfonated polymers of cyclopentadine with furfural. The preferred cationic exchange resin is strongly acidic exchange resin consisting essentially of a sulfonated polystyrene resin, for instance a divinylbenzene cross-linked polystyrene matrix having about 0.5 to 20 percent, preferably about 4 to 16%, divinylbenzene therein to which are attached ionizable or functional nuclear sulfonic acid groups. This resin is manufactured and sold commercially under various trade names, e.g. Dowex 50, Nalcite HCR. This resin, as commercially obtained, has a moisture content of about 50% and it can be used in the etherification process in this form or it can be dried and then used with little or no differences in results ascertainable. The resin can be dried as by heating at a temperature of about 212° F. for 12 to 24 hours or the free water can be removed as by refluxing with benzene or similar solvents and then filtering.

The resin particle size is chosen with a view to the manipulative advantages associated with any particular range of sizes. Although a small size (200–400 mesh) is frequently employed in autoclave runs, a mesh size of 20–50 or larger seems more favorable for use in fixed bed or slurry reactors. The catalyst concentration range should be sufficient to provide the desired catalytic effect, e.g. between about 0.5 and 50 percent (dry basis) by weight of the reactants, with the preferred range being between about 5 to 25 percent (dry basis), for example, 10 percent.

In a continuous reactor the catalyst concentration is better defined by weight hourly space velocity; that is to say, the weight of feed processed per weight of catalyst per hour. A weight hourly space velocity of about 1 to 8 (based on hydrocarbon feed) and up to about 17 based on total hydrocarbon and glycol may be used with advantage. The WHSV can be about 0.1 to 100 based on hydrocarbon feed only, with the preferred WHSV being about 2 to 20.

The ether-alcohol can be formed by reacting the tertiary olefin with about 0.1 to 100 moles of the glycol per mole of tertiary olefin, the usual amount being between about 0.5 to 5 moles of glycol per mole of tertiary olefin. The reaction, for example in the case of isobutylene and ethylene glylcol, proceeds as follows:

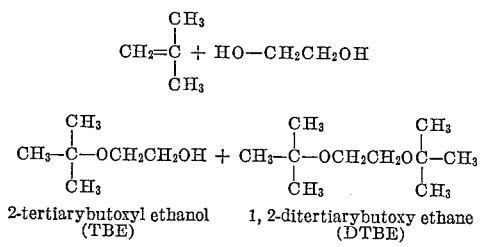

2-tertiarybutoxyl ethanol (TBE) ; 1, 2-ditertiarybutoxy ethane (DTBE)

The tertiary alkanol ethers of the following glycols and polyols may be used in accordance with the present invention: ethylene glycol, diethylene glycol, polyethylene glycols, propylene glycol, polypropylene glycol, mixed ethers of ethylene and propylene glycols, butylene glycols, 1,5-pentanediol, 2-ethylhexane-1,3-diol, 1,10-decane diol, trimethylol propane, glycerine neopentyl glycol, and pentaerythritol. In the case of diols, the monotertiaryalkyl ether is employed. However in the case of triol, tetraols and higher polyols, it is possible to use mono-, di-, or tritertiaryalkyl ethers, so long as at least one free OH group is available for esterification. It is also possible to use tertiaryalkyl ether derivatives of polyols which contain inorganic atoms, such as boron, silicon, aluminum, tin, lead, etc. Ethers representative of those which may be employed to form the esters of this invention are:

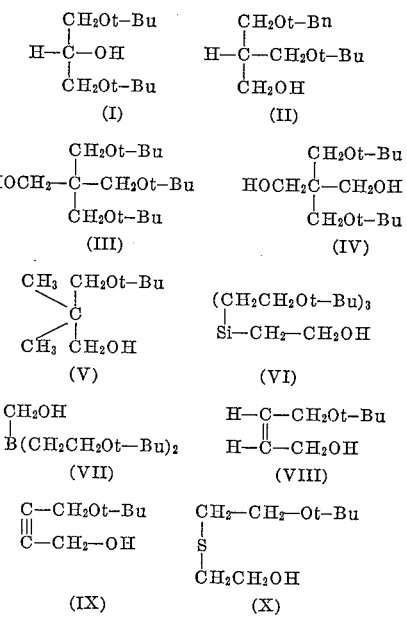

The esters of this invention may also sometimes be prepared by esterifying one hydroxyl of the glycol with the acid before etherification of the other hydroxyl with tertiary olefin, but this procedure applied to polycarboxylic acid may lead to reaction products containing mixed short-chain polyesters which are desirably avoided.

Polymerization using the compositions of the invention may be carried out as described in the copending application mentioned above by formation of the intermediate through olefin removal by heat and an acid catalyst with subsequent polyesterification, and with or without isolation of the intermediate. The decomposition can be performed by heating the tertiaryalkoxyalkyl ester under mild conditions while avoiding concurrent polymerization. When using a strong acid catalyst such as sodium bisulfate, sulfonic acids or phosphotungstic acid, this reaction is carried out preferably at about 50–200° C. at atmospheric pressure and in the liquid phase. Nitrogen or other purging gas may be employed. After liberation of the tertiary olefin the intermediate hydroxy ester is heated generally at least about 25° C., preferably to a temperature of about 200–300° C. at a reduced pressure and in the presence of an ester interchange catalyst as described above until the reaction is complete. This causes rapid distillation of glycol and polymerization takes place. Mixed polyesters of any desired composition can be prepared by mixing the desired tertiaryalkoxyalkyl esters in desired amounts before polymerization.

The following examples should be considered illustratice only and not limiting, The tertiarybutoxyethanol is prepared as follows. Into a 1-liter autoclave are charged 134 g. of isobutylene and 400 grams of commercial grade ethylene glycol. Fifty grams of Dowex 50X–12 sulfonated polystyrene-divinylbenzene type solid resin catalyst containing 12% divinylbenzene is added to the autoclave. The catalyst has a mesh size of about 50–100 and contains from about 42–48 percent moisture. The autoclave is sealed and the reaction mixture heated at 200° F., under autogenous pressure, for a period of about seven hours. The product is removed after cooling and depressurizing the autoclave. The product is worked up by first distilling off the unreacted isobutylene. The distillate (residue) is further distilled at atmospheric pressure or in vacuo to obtain as overhead the tertiarybutoxyethanol.

EXAMPLE I

Bis(2-tertiarybutoxyethyl)terephthalate

Into a 1-liter, 4-necked flask equipped with a stirrer, thermometer, Dean-Stark trap with reflux condenser, and heating mantle was placed 1 mole (194 gms.) of dimethyl terephthalate and 2.4 moles (286 gms.) of 2-tertiary butoxyethanol. Two grams of tetraisopropyl titanate ester interchange catalyst was then added to the mixture, which was heated at 130–135° C. until approximately 2 moles of methanol distilled from the mixture. The mixture was heated at 180–185° C. to remove by vaporization most of the unreacted 2-tertiary butoxyethanol. The reaction mixture solidified upon cooling to room temperature and the solid bis(2-tertiarybutoxyethyl) terephthalate was removed and recrystallized from methanol. The recrystallized product had a melting point (uncorrected) of 56. Saponification number: found 304; calculated 306.

EXAMPLE II

Bis(2-tertiarybutoxyethyl)maleate

Into a 2-liter, 4-necked flask, equipped with a stirrer, thermometer, Dean Stark trap and condenser was placed 1 mole of maleic anhydride (98.06 grams) and 2.2 moles of 2-tertiarybutoxyethanol, together with 500 ml. of toluene. The mixture was heated under reflux for several days and the water of reaction removed continuously during the course of the reaction. After the theoretical amount of water was formed, the solvent was removed and the bis(2-tertiarybutoxyethyl)maleate was purified by distillation under reduced pressure, and showed a boiling point of 156° C. at 0.3 mm., $n_D^{20}$ 1.4490, D20/4 1.0237.

Analysis.—Calculated: C, 60.74%; H, 8.92%. Found: C, 60.52%; H, 8.92%.

EXAMPLE III

Bis(2-tertiarybutoxyethyl)-2,2,5,5-tetramethyl adipate

Into a 10 ml. flask fitted with a thermometer, nitrogen inlet tube, condenser and receiver was placed 18 grams of dimethyl 2,2,5,5-tetramethyl adipate, 28 grams of tertiarybutoxy ethanol and 0.1 gram of tetraisopropyl titanate catalyst. The reaction mixture was heated under a slow stream of nitrogen for about 15 hours at 140–190° C., after which time about 5 grams of methanol was collected from the reaction mixture. The product was then distilled in vacuo to remove the unreacted tertiarybutoxy ethanol. Further distillation gave 29.6 grams of bis(2-tertiarybutoxyethyl)-2,2,5,5-tetramethyl adipate, B.P. 165° C. at 0.3 mm., $n_D^{20}$ 1.4406, D20/4 0.9679.

Analysis.—Calculated: C, 65.63%; H, 10.5167%. Found: C, 65.57%; H, 10.49%.

EXAMPLE IV

Bis(2-tertiarybutoxyethyl)fumarate

Into a 100 ml. flask equipped with a nitrogen inlet tube, thermometer, condenser, and receiver was placed 15 grams of dimethyl fumarate and 36.7 grams of bis(2-tertiarybutoxyethyl)fumarate. To this mixture was added 0.1 gram of tetraisopropyl titanate and the mixture was heated for about 13 hours from 135 to 180° C., while continuously bubbling nitrogen through the mixture. After about 6 grams of methanol was collected the mixture was distilled to remove the excess tertiarybutoxyethanol. Further distillation gave bis(2-tertiarybutoxyethyl)fumarate, B.P. 132° C. at 0.1 mm., which solidified to a crystalline solid, M.P. 35–36°.

Analysis.—Calculated: C, 60.74%; H, 8.92%. Found: C, 60.61%; H, 8.92%.

EXAMPLE V

Bis(2-tertiarybutoxyethyl)isophthalate

Into a 300 ml. flask equipped with a nitrogen inlet tube, thermometer, receiver and condenser was placed 30 grams of dimethyl isophthalate and 88.6 grams of tertiarybutoxyethanol and 0.1 gram of tetraisopropyl titanate. The mixture was heated at 145–190° C. over a period of about 7 hours, after which time about 18 grams of distillate was obtained, which was mainly methanol and some tertiarybutoxyethanol. After removing the unreacted tertiarybutoxyethanol by distillation, further distillation gave the bis(2-tertiarybutoxyethyl)isophthalate, B.P. 190° C. at 0.8 mm., $n_D^{20}$ 1.4406, D20/4 0.9674.

Analysis.—Calculated: C, 65.55%; H, 8.25%. Found: C, 64.63%; H, 8.9%.

EXAMPLE VI

Bis(2-tertiarybutoxyethyl)itaconate

Into a 100 ml. flask equipped with a nitrogen inlet tube, thermometer, receiver, and condenser was placed 22 grams of dimethyl itaconate and 49.3 grams of tertiarybutoxyethanol. To this mixture was then added 0.1 gram of tetraisopropyl titanate catalyst. The mixture was heated at 140–155° C. for about 7 hours in a nitrogen atmosphere, after which time about 9 grams of methanol was distilled overhead. After removing the unreacted t-butoxyethanol by distillation, further distillation gave bis(2-tertiarybutoxyethyl)itaconate, B.P. 130° C. at 0.1 mm., $n_D^{20}$ 1.4468, D20/4 1.0149.

Analysis.—Calculated: C, 61.7%; H, 9.12%. Found: C, 61.61%; H, 9.12%.

EXAMPLE VII

Methyl t-butoxyethyl itaconate

Into a one-liter flask fitted with a nitrogen inlet tube, stirrer, condenser and receiver, was placed 243 grams of tertiarybutoxyethanol and 238 grams of dimethyl itaconate. To this mixture was then added 2 grams of tetraisopropyl titanate. The mixture was heated to a temperature of 140–180° C. for several hours, until about 3 moles of methanol was collected as overhead. Distillation of the mixture was then carried out in vacuo and provided pure methyl t-butoxyethyl itaconate, B.P. 105–106° C. at 0.8 mm. Hg, $n_D^{20}$ 1.44639, Sp. Gr. 20/4 1.0491.

Analysis.—Calculated: C, 59.00%; H, 8.27%. Found: C, 58.96%; H, 8.27%.

Further distillation of the reaction mixture gave bis(2-tertiarybutoxyethyl)itaconate.

EXAMPLE VIII

Bis(3-methyl-5-tertiaryamyloxypentyl)terephthalate 3-methyl-5-tertiaryamyloxypentanol was prepared by the reaction of 3-methyl-1,5-pentanediol with 2-methyl-2-butene using Dowex 50 catalyst, in a similar manner to the t-butoxyethanol preparation from isobutylene and ethylene glycol described above.

Into a 50 ml. flask equipped with a nitrogen tube thermometer, condenser and receiver was placed 10.44 grams of 3-methyl-5-tertiaryamyloxy pentanol and 4.7 grams of dimethyl terephthalate. To this mixture was added 0.1 gram of tetraisopropyl titanate. The mixture was heated for about 7 hours at 165–200° C., during which time methanol was collected in the receiver. After the theoretical amount of methanol was collected, the unreacted 3-methyl-5-tertiaryamyloxypentanol was removed from the reaction mixture to afford bis(3-methyl-5-tertiaryamyloxypentyl)terephthalate as a viscous liquid.

EXAMPLE IX

Tertiarybutoxyethyl crotonate

Into a 1-liter flask fitted with a stirrer, condenser and receiver, thermometer and heating mantle were placed 150 grams of methyl crotonate and 466 grams of tertiarybutoxyethanol. To this mixture was then added 0.5 gram of dibutyl tin oxide as an ester interchange catalyst. The mixture was heated to 110° C. whereupon methanol commenced to distill from the reaction mixture. After slightly more than one mole of methanol was collected the mixture was cooled and distilled in vacuo. A mixture of the cis and trans t-butoxyethyl crotonate esters was obtainde, B.P. 65–76° C./1.25 mm., a center cut from the distillation was analyzed.

*Analysis.*—Calculated: C, 64.89%; H, 9.74%. Found: C, 64.66%; H, 9.79%. $n_D^{25}$ 1.4355.

EXAMPLE X

*Tertiarybutoxyethyl methacrylate*

Into a 100 ml. flask fitted with an 18″ distillation column were placed 20 grams of stabilized methyl methacrylate, 59 grams of tertiarybutoxyethanol and 0.05 gram of tetraisopropyl titanate catalyst. The mixture was heated at 130–145° C. for about 4 hours during which time 5 grams of methanol was collected overhead. The mixture was then distilled in vacuo to afford unreacted tertiarybutoxyethanol and tertiarybutoxyethyl methacrylate, B.P. 42–44° C./0.07–0.008 mm., $n_D^{20}$ 1.4306, D20/4 1.0491.

*Analysis.*—Calculated: C, 64.49%; H, 9.74%. Found: C, 64.33%; H, 9.79%.

The infrared spectrum of this compound showed the presence of the carbonyl group, a primary ether group, the tertiarybutoxy group, and an olefinic group.

EXAMPLE XI

*1-tertiarybutoxy-2-propyl methacrylate*

Into a 300 ml. flask fitted with a thermometer, nitrogen inlet tube and distillation head were placed 33 gms. of methyl methacrylate, 0.3 gm. of dibutyl tin oxide, 0.4 gm. of hydroquinone and 132 gms. of 1-tertiarybutyl-2-propanol. The latter compound was prepared from the reaction of isobutylene and propylene glycol using a Dowex 50 catalyst. The reactants were heated under a nitrogen atmosphere for about 14 hours at 140–150° C., during which time 12.1 grams of methanol was collected overhead. The cooled reaction mixture was filtered to remove the undissolved catalyst and distilled in vacuo. Distillation gave, initially, some unreacted methyl methacrylate, unreacted 1-t-butoxy-2-propanol and finally pure 1-t-butoxy-2-propyl methacrylate, B.P. 41° C./0.15 mm., $n_D^{20}$ 1.4275, Sp. Gr. 20/4 0.9169.

*Analysis.*—Calculated: C, 65.97%; H, 10.08%. Found: C, 65.87%; H, 10.18%.

The conversion, based on methyl methacrylate, was 67% of theory.

EXAMPLE XII

*Bis(7-tertiarybutoxy-2-propyl)maleate*

The equipment was similar to that used in Example XI. Into the reaction flask was charged 43.045 gms. of diethyl maleate and 80.76 gms. of 1-t-butoxy-2-propanol, and 0.6 gm. of dibutyl tin oxide catalyst. The mixture was heated under nitrogen for about 18 hours, during which time 23 ml. of ethanol was collected overhead. The mixture was filtered to remove undissolved catalyst and subsequently distilled in vacuo. Distillation gave 78 grams of pure bis(1-tertiarybutoxy-2-propyl)maleate, B.P. 128° C./0.3 mm., $n_D^{20}$ 1.4441, Sp. Gr. 20/4 0.9911.

*Analysis.*—Calculated: C, 62.76%; H, 9.37%. Found: C, 62.76%; H, 9.37%.

The conversion, based on diethyl maleate, was 91% of theory.

It is easily seen, therefore, that this invention provides a novel composition of matter prepared by a novel process.

It is claimed:
1. Tertiaryalkoxyalkyl esters having the formula

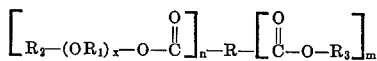

where R is a radical selected from the group consisting of phenylene and alkylene and mono-olefinically unsaturated alkylene radicals of about 2–20 carbon atoms, $R_1$ is a divalent aliphatic hydrocarbon radical of 2 to 12 carbon atoms, $R_2$ is a monovalent tertiary alkyl radical of 4 to 10 carbon atoms, $R_3$ is selected from the group consisting of hydrogen and lower alkyl, $x$ is a number from 1 to 5, $n$ is at least 1, and $m$ plus $n$ are 2 to 6.

2. The ester of claim 1 where $R_1$ is ethylene, $R_2$ is tertiarybutyl, $x$ is 1 and $n$ is 2.

3. The esters of claim 1 in which R has 2 to 10 carbon atoms.

4. The esters of claim 3 in which $R_1$ has 2 to 8 carbon atoms.

5. The esters of claim 4 in which $R_2$ has 4 to 7 carbon atoms.

6. Bis(2-tertiarybutoxyethyl)phthalate.
7. Bis(2-tertiarybutoxyethyl)maleate.
8. Bis(2-tertiarybutoxyethyl)fumarate.
9. Bis(2-tertiarybutoxyethyl)itaconate.

References Cited by the Examiner

UNITED STATES PATENTS

| | | | |
|---|---|---|---|
| 1,706,639 | 3/1929 | Van Schaacke et al. | 260—475 |
| 1,714,173 | 5/1929 | Kessler | 260—475 |
| 2,480,940 | 9/1949 | Leum et al. | 260—614 |
| 2,562,878 | 8/1951 | Blair | 260—475 |
| 2,876,211 | 3/1959 | Cupery | 260—73 |
| 3,056,817 | 10/1962 | Werber et al. | 260—475 |

OTHER REFERENCES

Kressman et al.: Ion Exchangers in Organic and Biochemistry (New York) 1957, p. 683.

Wagner et al.: Synthetic Organic Chemistry (New York, 1953), p. 232–3.

LORRAINE A. WEINBERGER, *Primary Examiner.*

DUVAL McCLUTCHEN, D.D. HORWITZ, *Examiners.*

A. D. ROLLINS, R. E. MASSA, T. L. GALLOWAY,
*Assistant Examiners.*